United States Patent
Liang et al.

(10) Patent No.: US 9,647,783 B2
(45) Date of Patent: May 9, 2017

(54) AUTOMATIC CHECKING METHOD FOR CLOCK SYNCHRONIZATION AND SPECIALIZED APPARATUS THEREOF

(71) Applicants: STATE GRID TIANJIN ELECTRIC POWER COMPANY, Tianjin (CN); STATE GRID CORPORATION OF CHINA, Beijing (CN)

(72) Inventors: Wei Liang, Tianjin (CN); Weibin Song, Tianjin (CN); Nan Wang, Tianjin (CN); Lingxu Guo, Tianjin (CN); Ke Xu, Tianjin (CN); Tao Liu, Tianjin (CN); Zheng Wang, Tianjin (CN); Chang Liu, Tianjin (CN)

(73) Assignees: STATE GRID TIANJIN ELECTRIC POWER COMPANY (CN); STATE GRID CORPORATION OF CHINA (CN)

( * ) Notice: Subject to any disclaimer, the term of this patent is extended or adjusted under 35 U.S.C. 154(b) by 16 days.

(21) Appl. No.: 14/646,612

(22) PCT Filed: Aug. 18, 2014

(86) PCT No.: PCT/CN2014/084627
§ 371 (c)(1),
(2) Date: May 21, 2015

(87) PCT Pub. No.: WO2015/043337
PCT Pub. Date: Apr. 2, 2015

(65) Prior Publication Data
US 2015/0341129 A1   Nov. 26, 2015

(30) Foreign Application Priority Data
Sep. 28, 2013 (CN) .......................... 2013 1 0459953

(51) Int. Cl.
*H04J 3/06* (2006.01)
*H04L 29/06* (2006.01)

(52) U.S. Cl.
CPC .......... *H04J 3/0644* (2013.01); *H04J 3/0667* (2013.01); *H04L 69/28* (2013.01)

(58) Field of Classification Search
None
See application file for complete search history.

(56) References Cited

U.S. PATENT DOCUMENTS

| 2014/0327574 A1* | 11/2014 | Achanta | G01S 19/215 342/357.59 |
| 2015/0043697 A1* | 2/2015 | Achanta | H04B 3/04 375/371 |
| 2016/0154109 A1* | 6/2016 | Achanta | G01S 19/20 342/357.58 |

FOREIGN PATENT DOCUMENTS

| CN | 1168065 A | 12/1997 |
| CN | 102298099 A | 12/2011 |

(Continued)

OTHER PUBLICATIONS

International Search Report for application No. PCT/CN2014/084627 mailed Nov. 26, 2014.

*Primary Examiner* — Steven H Nguyen
(74) *Attorney, Agent, or Firm* — Hauptman Ham, LLP

(57) ABSTRACT

The invention relates to an automatic checking method for clock synchronization, comprising the following steps: (1) regularly acquiring clock signals sent by a Beidou signal source, a GPS signal source and an SNTP signal source; (2) performing subtraction to the clock signals of the Beidou signal source and the GPS signal source and evaluating the absolute value of the difference; at the same time, performing subtraction to the clock signals of the Beidou signal source and the SNTP signal source and then evaluating the (Continued)

absolute value of the difference and finally judging the results of the two differences; and (3) constantly repeating steps (1) and (2). The operations in the present invention can efficiently avoid the problems in the existing technology, guarantee the consistency and accuracy of system time, and guarantee the stable and safe operation of the system and the normal operation of other power grid businesses.

4 Claims, 2 Drawing Sheets

(56) References Cited

FOREIGN PATENT DOCUMENTS

| CN | 203038018 U | 7/2013 |
|----|-------------|--------|
| CN | 103684733 A | 3/2014 |

\* cited by examiner

AUTOMATIC CHECKING METHOD FOR CLOCK SYNCHRONIZATION AND SPECIALIZED APPARATUS THEREOF

CROSS REFERENCE TO RELATED APPLICATION

This application claims the priority of Chinese Patent Application No. 201310459953.X, filed on Sep. 28, 2013 in the SIPO (The State Intellectual Property Office of People's Republic of China). Further, this application is the National Phase application of International Application No. PCT/CN2014/084627 filed Aug. 18, 2014, which designates the United States and was published in Chinese.

TECHNICAL FIELD

The invention belongs to the technical field of clock synchronization for an intelligent power grid and especially relates to an automatic checking method for clock synchronization and specialized apparatus thereof.

BACKGROUND

With the construction of an intelligent power grid, the dispatching automation system, power charging system, load monitoring system, fault recording device, microcomputer relay protection device, lightning location system, power station system, gate charging system, communication network and the like have higher requirements for clock synchronization. A safe, stable and accurate clock synchronization system has been a necessary form of infrastructure for supporting the safe operation of an intelligent power grid. In the operation of a power system, because the operation states of the power grid change all the time, the power grid dispatching adopts hierarchical multilevel management, and with the dispatching center far away from the site, the time of all the electrical automation apparatuses and microcomputer protection devices in the power plant or power station must be consistent, which is of significance for the operation and accident analysis (in particular, complex accident analysis) of the power grid.

The existing common reference clock signal is acquired the manner where a Beidou signal receiving module and a GPS signal receiving module acquire output signals from a Beidou signal source and a GPS signal source. The Beidou signal is generally taken as the reference clock signal and the reference clock signal is sent to all the synchronization signal receiving apparatuses by a Beidou signal output module. When the Beidou signal source fails, an alarming and blocking module is driven to work by a synchronization signal comparison module. The alarming and blocking module sends an alarm signal to a background monitoring system while sending a blocking signal to the Beidou signal output module, and then the synchronization signal comparison module is automatically switched to the output signal of the GPS signal source before the GPS signal output module sends the reference clock signal to all the synchronization signal receiving apparatuses. If the Beidou signal source and the GPS signal source fail at the same time, the synchronization signal comparison module drives the alarming and blocking module to work, and the alarming and blocking module sends an alarm signal to the background monitoring system while sending a blocking signal to the Beidou signal output module and the GPS signal output module. In general, the switching mode of the abovementioned reference clock signal can normally work. However, in actual use, once the Beidou signal source fails, the synchronization signal comparison module is not automatically switched to the GPS signal source, and meanwhile the alarming and blocking module is not driven to work. Therefore, the occurrence of a reference clock signal fault causes a clock information fault in the whole station and leads to serious consequences.

SUMMARY OF THE INVENTION

The present invention is aimed to overcome the shortages of the prior art and provide an automatic checking method for clock synchronization that is scientific and reasonable and easy to operate.

The present invention adopts the following technical solutions:

An automatic checking method for clock synchronization is characterized by comprising the following steps:

(1) Regularly acquiring clock signals sent by a Beidou signal source, a GPS signal source and an SNTP signal source;

(2) Performing subtraction to the clock signals of the Beidou signal source and the GPS signal source and evaluating the absolute value of the difference; at the same time, performing subtraction to the clock signals of the Beidou signal source and the SNTP signal source and then evaluating the absolute value of the difference; and finally judging the results of the two differences:

a) When the two differences are less than the preset value, outputting the clock signal of the Beidou signal source to each synchronization signal receiving apparatus as a reference clock signal; and b) When any one of the differences is greater than the preset value, entering a secondary operation process; and (3) Constantly repeating steps (1) and (2);

The secondary operation comprises the following steps:

(1) Performing subtraction to the clock signals of the GPS signal source and the SNTP signal source, and then evaluating the absolute value of the difference;

(2) Judging the result of this difference:

a) When the difference is less than the preset value, outputting the clock signal of the GPS signal source to each synchronization signal receiving apparatus as a reference clock signal; and b) When the difference is greater than the preset value, entering an alarm process;

The alarm process comprises the following steps:

(1) Sending a blocking signal to a Beidou signal output module and a GPS signal output module and stopping the sending of the reference clock signal; and (2) Sending an alarm signal to a background monitoring system.

Moreover, the cycle for regularly acquiring is 50 ms, and the preset value is 20 ms.

The present invention is further aimed to provide a specialized apparatus for the automatic checking method for clock synchronization. The specialized apparatus is characterized by comprising a Beidou signal receiving module, a GPS signal receiving module, a network module, a synchronization signal comparison module, a Beidou signal output module, a GPS signal output module and an alarming and blocking module, all of which are installed within a housing; a port of the synchronization signal comparison module is connected with the respective ends of the Beidou signal receiving module, the GPS signal receiving module, the network module, the Beidou signal output module, the GPS signal output module and the alarming and blocking module, respectively; the other ends of the Beidou signal receiving module, the GPS signal receiving module and the network module are connected with a Beidou signal source, a GPS signal source and an SNTP signal source, respectively; the other ends of the Beidou signal output module and the GPS signal output module are both connected with a respective reference clock signal input end of a plurality of synchronization signal receiving apparatuses; the other end of the alarming and blocking module is connected with an alarm signal input end of the background monitoring system; and two blocking signal output ends of the alarming and blocking module are connected with a respective blocking signal input end of the Beidou signal output module and the GPS signal output module.

Moreover, the network module adopts a wireless transmission mode or a wired transmission mode.

The present invention has the following advantages and positive effects:

In the present invention, the three clock signals output by the Beidou signal source, the GPS signal source and the SNTP signal source are taken as the original clock signals. Subtraction is then performed to the Beidou signal and the GPS signal, and at the same time to the Beidou signal and the SNTP signal. The absolute values of the two differences are evaluated and are then compared with the preset value. If the differences exceed the preset value, subtraction is performed to the GPS signal and the SNTP signal. Finally, the results can determine the signal source by which the clock signal output is taken as the reference clock signal of a plurality of synchronization signal receiving apparatuses. The abovementioned operations can efficiently avoid the problems in the existing technology, guarantee the consistency and accuracy of system time, and guarantee the stable and safe operation of the system and normal operation of other power grid businesses.

DETAILED DESCRIPTION

The present invention is further illustrated below in conjunction with embodiments. The embodiments below are illustrative and not for limiting the scope of protection of the present invention.

Figure 1:
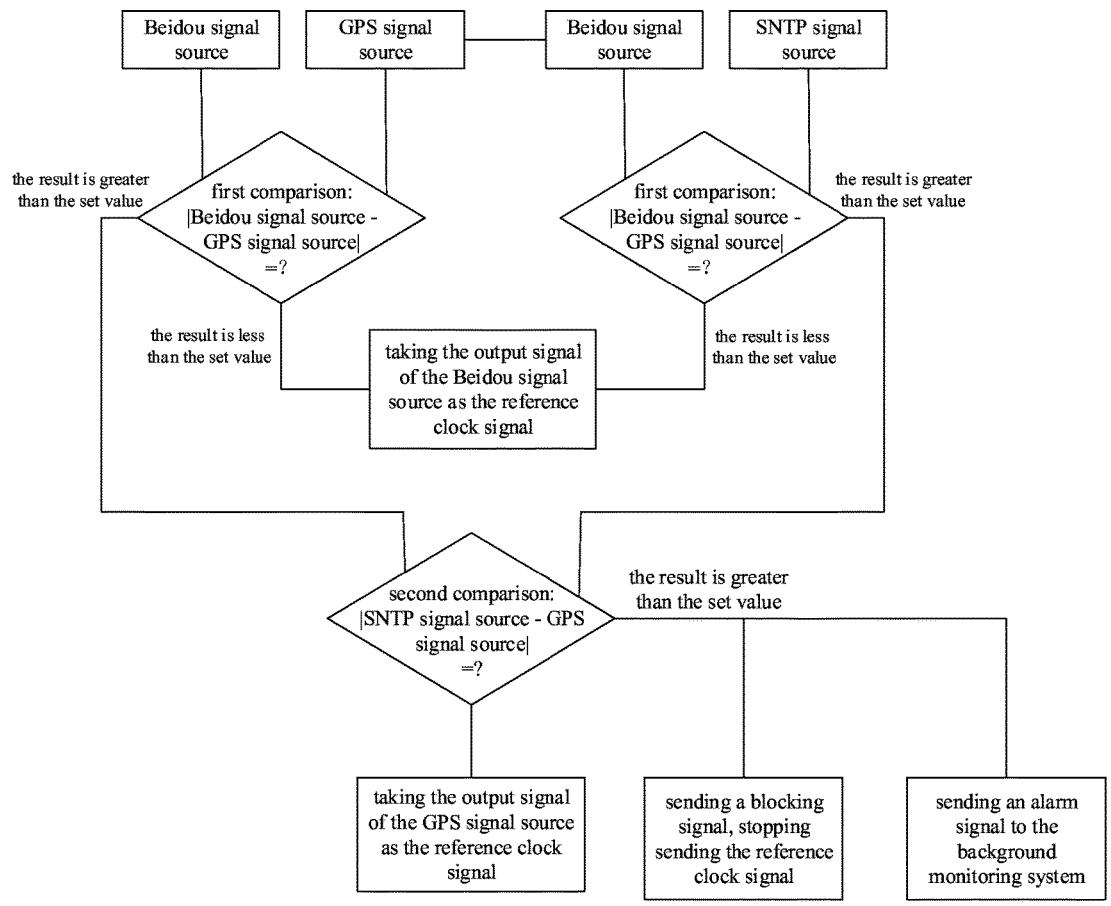
FIG. 1 is an operation flow chart of the present invention.

As shown in FIG. 1, the innovation of an automatic checking method for clock synchronization of the present invention is that it comprises the following steps:
(1) Regularly acquiring clock signals sent by a Beidou signal source, a GPS signal source and an SNTP signal source;
(2) Performing subtraction to the clock signals of the Beidou signal source and the GPS signal source and evaluating the absolute value of the difference; at the same time, performing subtraction to the clock signals of the Beidou signal source and the SNTP signal source and then evaluating the absolute value of the difference; and finally judging the results of the two differences:
a) When the two differences are less than the preset value, outputting the clock signal of the Beidou signal source to each synchronization signal receiving apparatus as a reference clock signal; and
b) When any one of the differences is greater than the preset value, entering a secondary operation process; and
(3) Constantly repeating steps (1) and (2);

The secondary operation comprises the following steps:
(1) Performing subtraction to the clock signals of the GPS signal source and the SNTP signal source, and then evaluating the absolute value of the difference;
(2) Judging the result of this difference:
a) When the difference is less than the preset value, outputting the clock signal of the GPS signal source to each synchronization signal receiving apparatus as a reference clock signal; and
b) When the difference is greater than the preset value, entering an alarm process;

The alarm process comprises the following steps:
(1) Sending a blocking signal to a Beidou signal output module and a GPS signal output module and stopping the sending of the reference clock signal; and
(2) Sending an alarm signal to a background monitoring system.

The cycle for regularly acquiring is 50 ms, and the preset value is 20 ms.

The abovementioned processes preferably employ the Beidou signal source. If the Beidou signal source fails, the GPS signal source is preferably employed, and if both the Beidou and the GPS signal sources fail, an alarm is output and the output of each clock signal is blocked.

Figure 2:
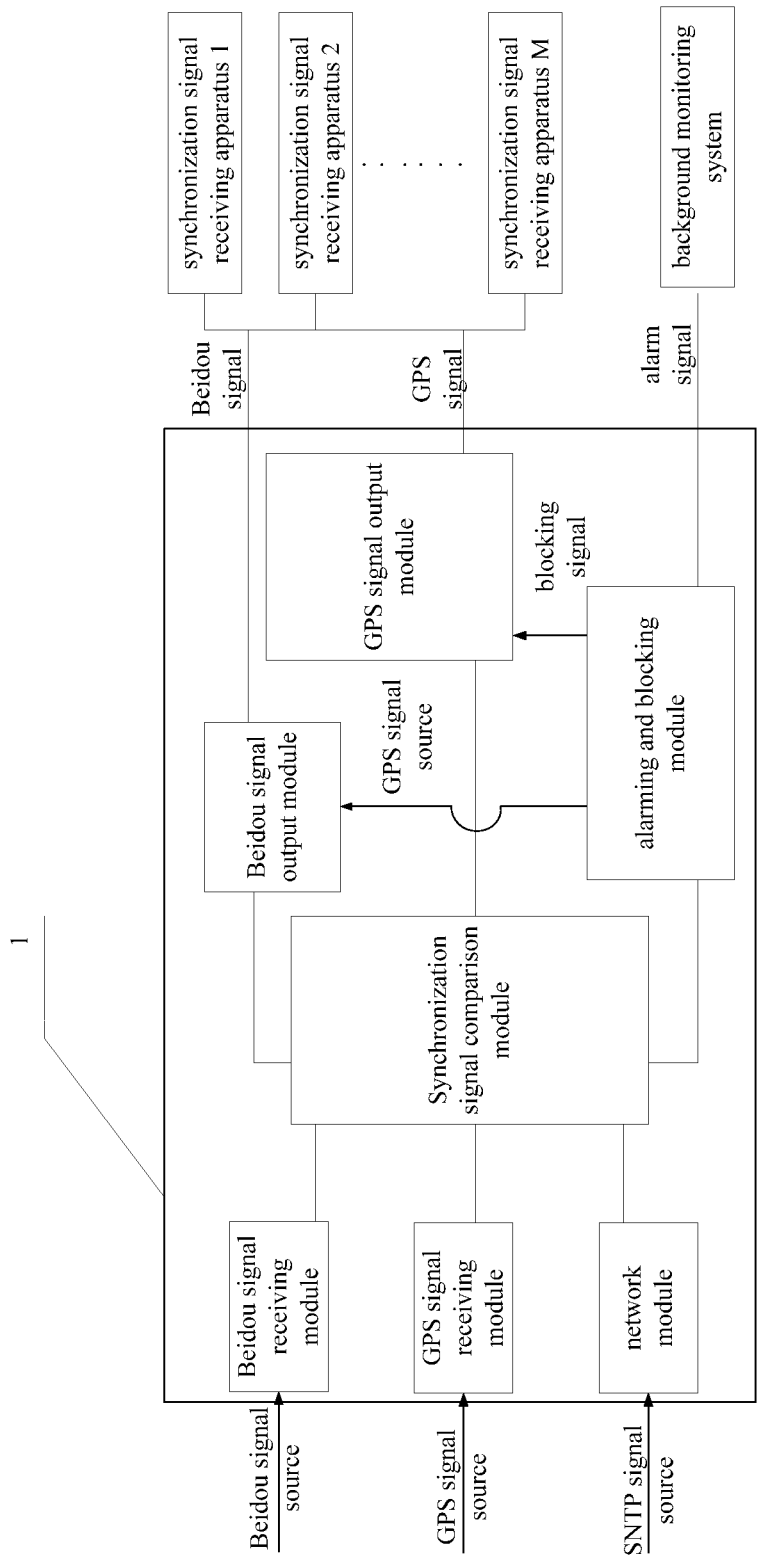
FIG. 2 is a structural schematic diagram of a specialized apparatus of the present invention.

The structure of the specialized apparatus used in the present invention is as shown in FIG. 2: comprising a Beidou signal receiving module, a GPS signal receiving module, a network module, a synchronization signal comparison module, a Beidou signal output module, a GPS signal output module and an alarming and blocking module, wherein the Beidou signal receiving module, the GPS signal receiving module, the clock synchronization comparison module, the Beidou signal output module, the GPS signal output module and the alarming and blocking module are components of the existing technology mainly for the automatic comparison of the Beidou signal and the GPS signal. However, in order to adapt to the automatic checking method of the present invention, a network module is further installed in a housing 1. The specific connection of various modules is that the Beidou signal receiving module, the GPS signal receiving module, the network module, the synchronization signal comparison module, the Beidou signal output module, the GPS signal output module and the alarming and blocking module are installed in the housing; a port of the synchronization signal comparison module is connected with the respective ends of the Beidou signal receiving module, the GPS signal receiving module, the network module, the Beidou signal output module, the GPS signal output module and the alarming and blocking module, respectively; the other ends of the Beidou signal receiving module, the GPS signal receiving module and the network module are connected with a Beidou signal source, a GPS signal source and an SNTP signal source, respectively; the other ends of the Beidou signal output module and the GPS signal output module are both connected with a respective reference clock signal input end of a plurality of synchronization signal receiving apparatuses; the other end of the alarming and blocking module is connected with an alarm signal input end of the background monitoring system; and two blocking signal output ends of the alarming and blocking module are connected with a respective blocking signal input end of the Beidou signal output module and the GPS signal output module.

The abovementioned network module can adopt a wireless transmission mode (i.e., a hardware module supporting wireless transmission), and also can adopt a wired transmission mode (i.e., a hardware module connected by a network cable). Both kinds of modules can acquire the clock signal output by the SNTP signal source. The abovementioned alarm signal is of a high level for triggering the background monitoring system, and the blocking signal is of a high level for blocking the Beidou signal output module and the GPS signal output module.

In the present invention, the three clock signals output by the Beidou signal source, the GPS signal source and the SNTP signal source are taken as the original clock signals. Subtraction is then performed to the Beidou signal and the GPS signal, and at the same time to the Beidou signal and the SNTP signal. The absolute values of the two differences are evaluated and are then compared with the preset value. If the differences exceed the preset value, subtraction is performed to the GPS signal and the SNTP signal. Finally, the results can determine the signal source by which the clock signal output is taken as the reference clock signal of a plurality of synchronization signal receiving apparatuses. The abovementioned operations can efficiently avoid the problems in the existing technology, guarantee the consistency and accuracy of system time, and guarantee the stable and safe operation of the system and the normal operation of other power grid businesses.

The invention claimed is:

1. An automatic checking method for clock synchronization characterized in that it comprises the following steps:
   (1) Regularly acquiring clock signals sent by a Beidou signal source, a GPS signal source and an SNTP signal source;
   (2) Performing subtraction to the clock signals of the Beidou signal source and the GPS signal source and evaluating a first absolute value of the difference; at the same time, performing subtraction to the clock signals of the Beidou signal source and the SNTP signal source and then evaluating a second absolute value of the difference; and finally judging the results of the two differences:
      a) When the first absolute value of the difference and the second absolute value of the difference are all less than a preset value, outputting the clock signal of the Beidou signal source to each synchronization signal receiving apparatus as a reference clock signal; and
      b) When any one of the first absolute value of the difference and the second absolute value of the difference is greater than the preset value, entering a secondary operation process; and
   (3) Constantly repeating steps (1) and (2);
   The secondary operation comprises the following steps:
   (1) Performing subtraction to the clock signals of the GPS signal source and the SNTP signal source and then evaluating a third absolute value of the difference;
   (2) Judging the result of this difference:
      a) When the third absolute value of the difference is less than the preset value, outputting the clock signal of the GPS signal source to each synchronization signal receiving apparatus as a reference clock signal; and
      b) When the third absolute value of the difference is greater than the preset value, entering an alarm process;
   The alarm process comprises the following steps:
   (1) Sending a blocking signal to a Beidou signal output module and a GPS signal output module and stopping sending the reference clock signal; and
   (2) Sending an alarm signal to a background monitoring system.

2. The automatic checking method for clock synchronization according to claim 1, characterized in that the cycle for regularly acquiring is 50 ms and the preset value is 20 ms.

3. A specialized apparatus for automatic checking clock synchronization, characterized in that the apparatus comprises a Beidou signal receiving module, a GPS signal receiving module, a network module, a synchronization signal comparison module, a Beidou signal output module, a GPS signal output module and an alarming and blocking module, all of which are installed within a housing; a port of the synchronization signal comparison module is connected with the respective ends of the Beidou signal receiving module, the GPS signal receiving module, the network module, the Beidou signal output module, the GPS signal output module and the alarming and blocking module, respectively; the other ends of the Beidou signal receiving module, the GPS signal receiving module and the network module are connected with a Beidou signal source, a GPS signal source and an SNTP signal source, respectively; the other ends of the Beidou signal output module and the GPS signal output module are both connected with a respective reference clock signal input end of a plurality of synchronization signal receiving apparatuses; the other end of the alarming and blocking module is connected with an alarm signal input end of the background monitoring system; and two blocking signal output ends of the alarming and blocking module are connected with a respective blocking signal input end of the Beidou signal output module and the GPS signal output module.

4. The specialized apparatus for automatic checking clock synchronization according to claim 3, characterized in that the network module adopts a wireless transmission mode or a wired transmission mode.

* * * * *